(12) United States Patent
Schneider

(10) Patent No.: US 12,555,474 B2
(45) Date of Patent: Feb. 17, 2026

(54) INFORMING A DRIVER OF A MOTOR VEHICLE

(71) Applicant: Bayerische Motoren Werke Aktiengesellschaft, Munich (DE)

(72) Inventor: Sebastian Schneider, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 776 days.

(21) Appl. No.: 17/799,318

(22) PCT Filed: Nov. 23, 2020

(86) PCT No.: PCT/EP2020/083053
§ 371 (c)(1),
(2) Date: Aug. 12, 2022

(87) PCT Pub. No.: WO2021/170268
PCT Pub. Date: Sep. 2, 2021

(65) Prior Publication Data
US 2025/0225868 A1 Jul. 10, 2025

(30) Foreign Application Priority Data
Feb. 25, 2020 (DE) .................. 10 2020 104 899.8

(51) Int. Cl.
*G08G 1/0967* (2006.01)
(52) U.S. Cl.
CPC .................. *G08G 1/0967* (2013.01)
(58) Field of Classification Search
CPC ............. G08G 1/0967; G08G 1/09626; G08G 1/096716; G08G 1/09675; H04W 4/024; H04W 4/40; H04W 4/90
See application file for complete search history.

(56) References Cited

U.S. PATENT DOCUMENTS 9,656,606 B1 * 5/2017 Vose ................... G01S 19/42
11,138,879 B2 * 10/2021 Cohen ................... H04W 4/44
(Continued)

FOREIGN PATENT DOCUMENTS

| CN | 110450790 A | 11/2019 |
|---|---|---|
| DE | 10 2013 217 531 A1 | 3/2015 |

(Continued)

OTHER PUBLICATIONS

International Search Report (PCT/ISA/210) issued in PCT Application No. PCT/EP2020/083053 dated Feb. 18, 2021 with English translation (four (4) pages).
(Continued)

*Primary Examiner* — Hoi C Lau
(74) *Attorney, Agent, or Firm* — Crowell & Moring LLP

(57) ABSTRACT

A driver of a motor vehicle is informed by the methods, apparatuses, and systems provided. A first surroundings map is received that describes the surroundings of the motor vehicle at a first point in time. A second surroundings map is received that describes the surroundings of the motor vehicle at a second point in time. The second point in time temporally following the first point in time. The position of the motor vehicle is received or determined. A changed in the second surroundings map is detected in comparison to the first surroundings map in the surroundings of the position of the motor vehicle. The driver of the motor vehicle is informed of the change.

7 Claims, 2 Drawing Sheets

(56) References Cited

U.S. PATENT DOCUMENTS

| | | | |
|---|---|---|---|
| 2010/0004855 A1* | 1/2010 | Liao | G01C 21/3848 |
| | | | 348/207.99 |
| 2015/0081216 A1* | 3/2015 | Bartels | G01C 21/3697 |
| | | | 701/532 |
| 2019/0073545 A1 | 3/2019 | Dolgov et al. | |
| 2019/0143967 A1* | 5/2019 | Kutila | B60W 60/0016 |
| | | | 701/23 |
| 2019/0337531 A1 | 11/2019 | Oe et al. | |
| 2020/0152059 A1* | 5/2020 | Cohen | G01C 21/3691 |
| 2021/0231460 A1* | 7/2021 | Uno | G06T 7/254 |
| 2021/0247201 A1* | 8/2021 | Hori | G01C 21/3673 |
| 2025/0225868 A1* | 7/2025 | Schneider | G08G 1/096716 |

FOREIGN PATENT DOCUMENTS

| | | |
|---|---|---|
| DE | 10 2017 215 552 A1 | 3/2019 |
| EP | 2 843 643 A1 | 3/2015 |
| JP | 10-103988 A | 4/1998 |
| JP | 2006-209106 A | 8/2006 |
| JP | 2011-159206 A | 8/2011 |
| JP | 2015-55629 A | 3/2015 |
| WO | WO 2017/157787 A1 | 9/2017 |

OTHER PUBLICATIONS

German-language Written Opinion (PCT/ISA/237) issued in PCT Application No. PCT/EP2020/083053 dated Feb. 18, 2021 (seven (7) pages).

German-language Search Report issued in German Application No. 10 2020 104 899.8 dated Nov. 2, 2020 with partial English translation (11 pages).

Chinese-language Office Action issued in Chinese Application No. 202080097306.7 dated Nov. 21, 2024 with partial English translation (20 pages).

Japanese-language Office Action issued in Japanese Application No. 2022-549323 dated Mar. 5, 2025 with English translation (7 pages).

* cited by examiner

INFORMING A DRIVER OF A MOTOR VEHICLE

BACKGROUND AND SUMMARY OF THE INVENTION

The present subject matter relates to a device and a method for informing a driver of a motor vehicle.

When driving a motor vehicle along routes familiar to them, human drivers perceive fewer and fewer infrastructure objects, such as traffic signs, since the drivers assume that these infrastructure objects are permanently present. This is not the case, however. Traffic signs, in particular, do not change frequently but do change regularly.

This may result in undesirable or even dangerous situations, since the driver, believing that he/she is aware of the traffic rules in force at a given location, may violate the traffic rules which have changed in the meantime.

It is the object of the present subject matter to specify a device and a method that solves the aforementioned problem.

The object is achieved by the features of the independent patent claims. Advantageous embodiments are described in the dependent claims. It should be noted that additional features of a patent claim that is dependent on an independent claim, without the features of the independent claim or only in combination with a subset of the features of the independent claim, may constitute a separate invention which is independent of the combination of all the features of the independent patent claim and which may become the subject matter of an independent claim, a divisional application, or a subsequent application. This applies equally to technical teachings described in the description, which may constitute an invention independently of the features of the independent claims.

A first aspect of the present subject matter relates to a device for informing a motor vehicle driver.

The device is configured to receive a first surroundings map, which describes a vicinity of the motor vehicle at a first point in time.

The surroundings map may achieve a very high level of detail and not only cover a road network, but also information on infrastructure, such as peripheral development and traffic signs. Surroundings maps may be referred to as "high-precision maps". The surroundings maps are not simply static maps. Instead, the surroundings maps are constantly updated by the already existing fleets of motor vehicles. For this purpose, the vehicles use sensors (e.g., camera, radar, lidar) to perceive their respective surroundings and compare it with the stored map information. If the surroundings perceived by the sensors differs from the information in the surroundings map, the surroundings map is updated.

The surroundings maps are then updated across the entire motor vehicle fleet via a backend, so that an update of the surroundings map by a first motor vehicle is distributed to the other motor vehicles in the vehicle fleet. In practice, however, it is unlikely that one vehicle alone will initiate a change to the map, which will then in turn be distributed to the fleet. Depending on the change detected, a map provider will wait for the change to be provided by multiple vehicles in order to reduce the probability of incorrect detection by the vehicles. In some cases, the map provider will also send its own surveying vehicles to the location concerned if the data from the fleet vehicles is insufficient or contradictory.

The device is also configured to receive a second surroundings map, which describes the vicinity of the motor vehicle at a second point in time, the second point in time following the first point in time.

The device is configured, for example, to receive the second surroundings map from a map provider or a backend. The device is also configured, for example, to receive the second surroundings map from another device of the motor vehicle itself, which is configured to create the second surroundings map itself.

For example, the second point in time can be after a pre-defined time interval has elapsed following the first point in time. Alternatively, the second point in time can also be triggered in an event-driven manner by, for example, the motor vehicle requesting an update of the surroundings map for the geographical region or part of the geographical region of the next planned journey.

In addition, the device is configured to accept or determine a position of the motor vehicle, for example by means of GPS.

In addition, the device is configured to detect a change in the second surroundings map in comparison to the first surroundings map in the vicinity of the position of the motor vehicle. In particular, the device is configured to detect a change in the infrastructure recorded in the map.

In particular, the vicinity of the position of the motor vehicle is an area around the motor vehicle, for example a circle or a rectangle around the motor vehicle. Alternatively, the vicinity of the position of the vehicle is an area in front of the vehicle in the direction of travel, such as a circular sector in front of the vehicle or a section of the area through which a planned route of the vehicle passes.

In addition, the device is configured to inform the driver of the vehicle about the change, for example, acoustically or visually. In an advantageous embodiment, the change in the second surroundings map in comparison to the first surroundings map is a change affecting the driver of the motor vehicle, in particular an addition, alteration (e.g., parking and stopping ban, speed restriction) or a removal of a traffic sign.

In a further advantageous embodiment, the change in the second surroundings map in comparison to the first surroundings map will lead to a change in the traffic rules in force in the vicinity of the change, for example due to a change of traffic signs, or road or parking space markings in the surroundings map.

In a further advantageous embodiment, the change in the second surroundings map in comparison to the first surroundings map leads to a change in the traffic priority rules in force in the vicinity of the change.

In a further advantageous embodiment, the change in the second surroundings map in comparison to the first surroundings map leads to a change in the parking rules in force in the vicinity of the change.

In a further advantageous form, the device is designed to determine an intention of the driver of the motor vehicle in driving the motor vehicle and to inform the driver of the motor vehicle about the change if the change relates to the intention of the driver of the motor vehicle in driving the motor vehicle.

The change relates to the intention of the driver of the motor vehicle when, for example, the driver must take account of the changed circumstances in order to drive safely on the road and/or in compliance with the rules on the road when driving the vehicle.

In a further advantageous embodiment, the device is configured to detect a severity of the change and to inform the driver of the motor vehicle according to the severity detected.

The present subject matter is based on the knowledge that some changes have only unpleasant but not critical consequences if they are not observed. If, for example, the driver fails to observe changed parking space markings, they only risk a fine. If, for example, the driver fails to comply with a modified right of way rule, however, a potentially fatal accident could occur.

Another aspect of the present subject matter relates to a method for informing a driver of a motor vehicle.

One step of the method consists of receiving a first surroundings map which describes a vicinity of the motor vehicle at a first point in time.

Another step in the method consists of receiving a second surroundings map, which describes the vicinity of the motor vehicle at a second point in time, the second point in time following the first point in time.

Another step in the method consists of determining or receiving a position of the motor vehicle.

A further step of the method is detecting a change in the second surroundings map in comparison to the first surroundings map in the vicinity of the position of the motor vehicle.

Another step in the method is informing the driver of the motor vehicle about the change.

The above remarks concerning the device according to the present subject matter according to the first aspect of the present subject matter also apply mutatis mutandis to the method according to the present subject matter according to the second aspect of the present subject matter. The advantageous exemplary embodiments of the method according to the present subject matter not explicitly described here and in the patent claims correspond to the advantageous exemplary embodiments of the device according to the present subject matter described above or described in the patent claims.

DETAILED DESCRIPTION OF THE DRAWINGS

Figure 1:
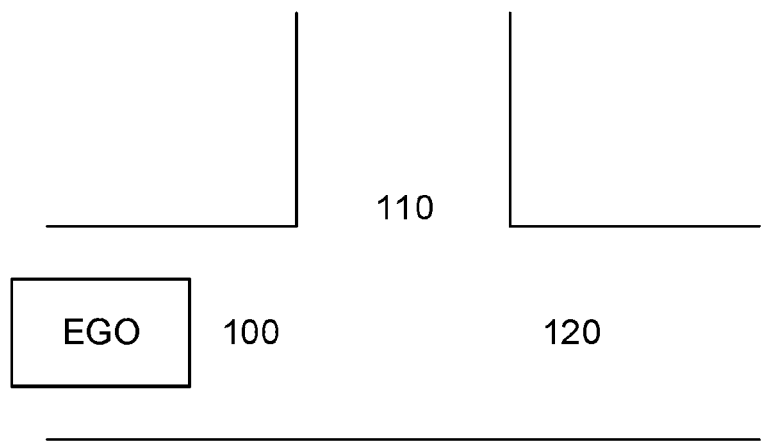
FIG. 1 shows an example traffic situation at a first point in time.
Figure 2:
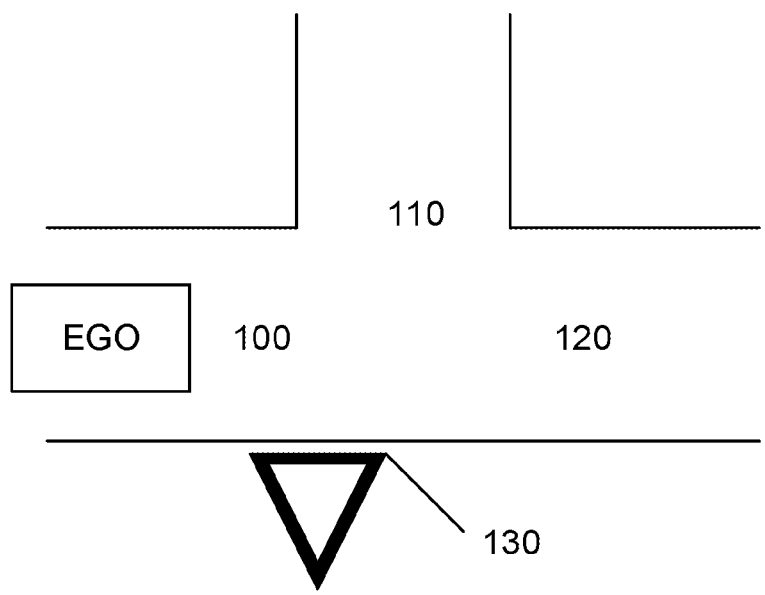
FIG. 2 shows an example traffic situation at a second point in time.

FIG. 1 shows an exemplary traffic situation at a first point in time. In the figure, the motor vehicle EGO is located at a so-called T-intersection with the junctions 100, 110 and 120. The motor vehicle enters the T-intersection from the junction 100. This T-intersection is un-signposted, so that according to the applicable traffic rule "right before left" the motor vehicle EGO would always have right of way, regardless of any road users at the junctions 110 and 120. For example, this un-signposted T-intersection is stored in a first surroundings map. FIG. 2 shows the exemplary traffic situation at a second point in time. In the figure, the motor vehicle EGO is located at the same T-intersection with the junctions 100, 110 and 120. However, in the meantime, the traffic infrastructure at this junction has been changed and a "Give Way" sign 130 has been installed next to the junction 100. Thus, the motor vehicle EGO no longer always has right of way when entering the T-intersection. For example, this sign-posted T-intersection is stored in a second surroundings map.

The device SV according to the present subject matter for informing the driver of the motor vehicle is configured to receive the first surroundings map from a backend, wherein the first surroundings map describes a vicinity of the motor vehicle EGO at a first point in time.

In addition, the device SV according to the present subject matter is configured to receive the second surroundings map from a backend, wherein the second surroundings map describes the surroundings of the motor vehicle EGO at a second point in time, the second point in time following the first point in time.

In addition, the device SV is configured to determine a position of the motor vehicle EGO, i.e., for example, the position that the motor vehicle EGO enters the T-intersection via the junction 100.

In addition, the device SV is configured to detect the change in the second surroundings map in comparison to the first surroundings map in the vicinity of the position of the motor vehicle EGO, i.e. the "Give Way" sign 130 that has been installed in the meantime.

In addition, the device SV is configured to inform the driver of the motor vehicle EGO of the change, for example by means of a visual signal in the instrument cluster of the vehicle and/or by an audible warning tone.

Figure 3:
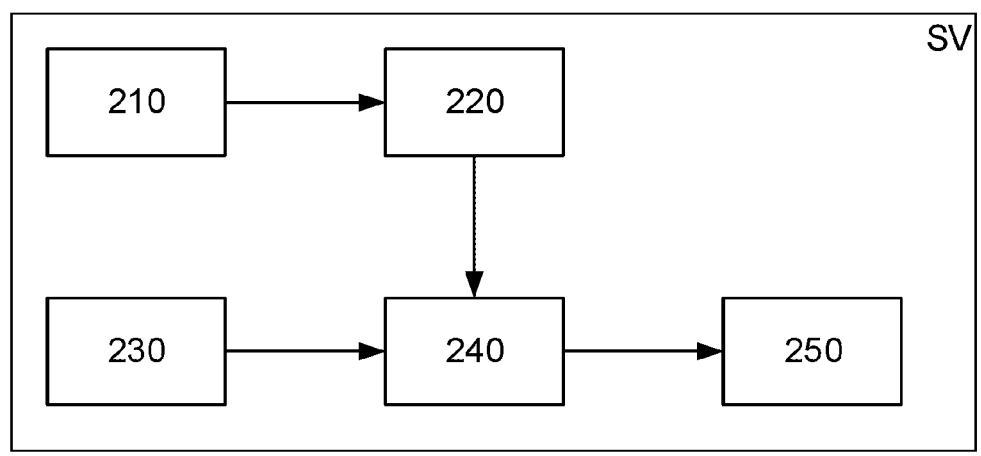
FIG. 3 shows an example of the device.

FIG. 3 shows an embodiment of the device SV according to the present subject matter. The device SV for informing a driver of a motor vehicle EGO is configured to receive a first surroundings map which describes a vicinity of the motor vehicle EGO at a first point in time, and to receive a second surroundings map which describes the vicinity of the motor vehicle EGO at a second point in time, the second point in time following the first point in time.

In addition, the device is configured to receive or determine a position of the motor vehicle EGO.

The device SV is additionally configured to detect a change in the second surroundings map in comparison to the first surroundings map in the vicinity of the position of the motor vehicle EGO by means of a change detection unit 210.

In addition, the device SV is configured to determine, by means of a change classification unit 220, whether the detected change in the second surroundings map would affect the driver of the motor vehicle assuming normal intentions, such as when turning off, parking, or stopping at a "Give Way" sign 130.

In addition, the device SV is configured to determine, by means of an intention detection unit 230, an intention of the driver of the motor vehicle EGO when driving the motor vehicle EGO.

In addition, the device SV is configured to check, by means of an intention checking unit 240, whether the intention of the driver actually determined by means of the intention detection unit 230 is affected by the change.

In this case, the device SV is configured to inform the driver of the motor vehicle EGO of the change by means of an information unit 250.

The invention claimed is:

1. A device for informing a driver of a motor vehicle, configured to:
receive a first surroundings map which describes a vicinity of the motor vehicle at a first point in time;
receive a second surroundings map which describes the vicinity of the motor vehicle at a second point in time, the second point in time following the first point in time;
receive or determine a position of the motor vehicle;
detect a change in the second surroundings map in comparison to the first surroundings map in the vicinity of the position of the motor vehicle;
determine a severity of the change; and inform the driver of the motor vehicle of the change according to the severity of the change.

2. The device according to claim 1, wherein the change in the second surroundings map in comparison to the first surroundings map is a change affecting the driver of the motor vehicle.

3. The device according to claim 1, wherein the change in the second surroundings map in comparison to the first surroundings map leads to a change in traffic rules in force in a vicinity of the change.

4. The device according to claim 1, wherein the change in the second surroundings map in comparison to the first surroundings map leads to a change in traffic priority rules in force in a vicinity of the change.

5. The device according to claim 1, wherein the change in the second surroundings map in comparison to the first surroundings map leads to a change in parking rules in force in a vicinity of the change.

6. The device according to claim 1, wherein the device is further configured to:

identify an intention of the driver of the motor vehicle in driving the motor vehicle, and inform the driver of the motor vehicle about the change if the change relates to the intention of the driver of the motor vehicle in driving the motor vehicle.

7. A method for informing a driver of a motor vehicle, the method comprising:

receiving a first surroundings map which describes a vicinity of the motor vehicle at a first point in time;

receiving a second surroundings map which describes the vicinity of the motor vehicle at a second point in time, the second point in time following the first point in time;

determining or receiving a position of the motor vehicle;

detecting a change in the second surroundings map in comparison to the first surroundings map in a vicinity of the position of the motor vehicle;

determine a severity of the change; and informing the driver of the motor vehicle about the change according to the severity of the change.

\* \* \* \* \*